United States Patent Office 3,595,618
Patented July 27, 1971

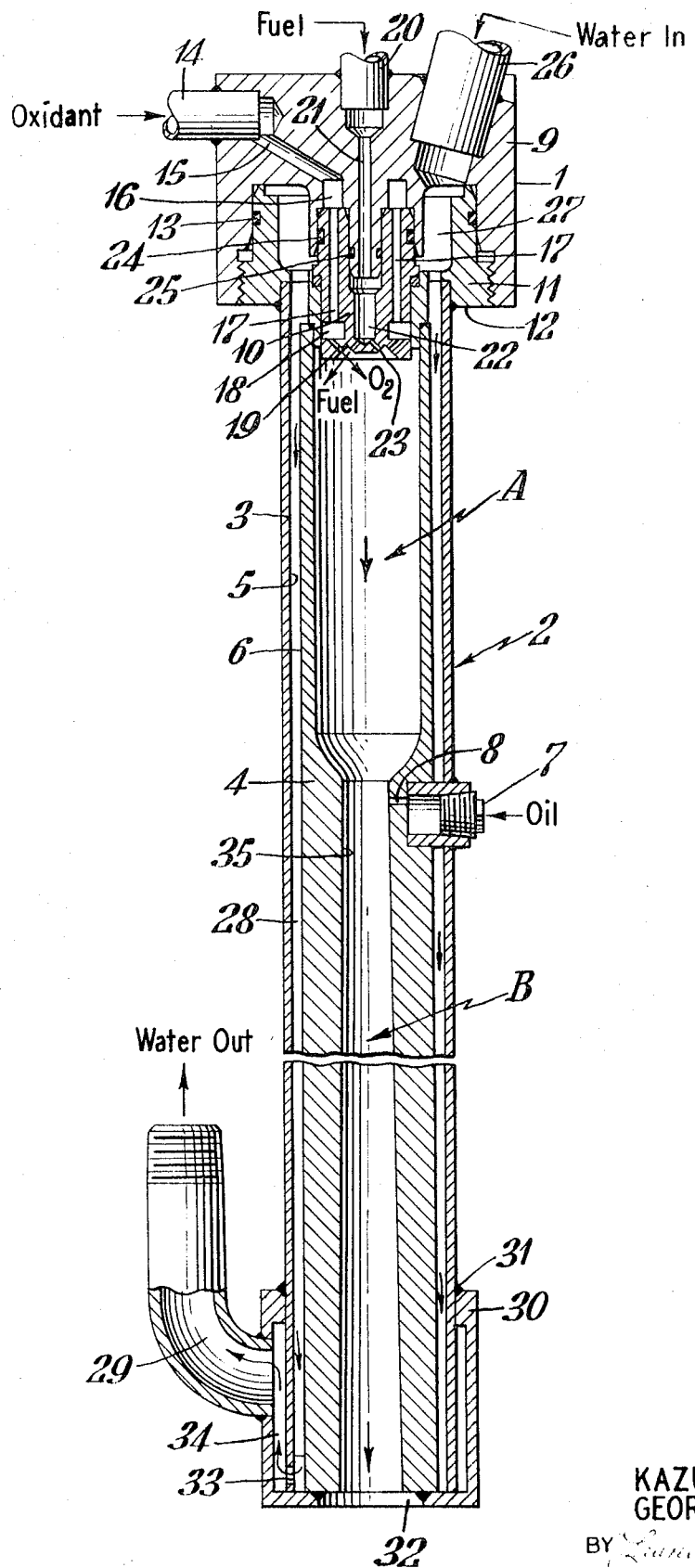

3,595,618
MANUFACTURE OF CARBON BLACK
Kazuo Kiyonaga, Newark, N.J., and George H. Smith, Sarasota, Fla., assignors to Union Carbide Corporation
Continuation-in-part of application Ser. No. 528,182, Feb. 17, 1966. This application July 22, 1969, Ser. No. 847,793
Int. Cl. C09c 1/50
U.S. Cl. 23—209.4
13 Claims

ABSTRACT OF THE DISCLOSURE

A process for manufacturing carbon black which consists of injecting a hydrocarbon feed material into a stream of very hot, high velocity combusted gases. The velocity must be greater than 1,000 feet per second, and the temperature 4,000° F.–6,000° F. The combusted gases are obtained by burning fuel with pure oxygen or oxygen enriched air. The process makes it possible to obtain channel grade carbon black by means of a furnace process.

---

This application is a continuation-in-part of application Ser. No. 528,182, filed Feb. 17, 1966, now abandoned.

BACKGROUND

This application relates to the manufacture of carbon black. More specifically, it relates to a process for the manufacture of carbon black by a furnace type process and to the product thus obtained.

Four general types of carbon black are recognized, these being lamp black, channel black, furnace black and thermal black. The classifications are based on the method by which the black is made. Further sub-classification is based on the use for which the black is intended. The rubber industry consumes over 90% of the carbon black produced, principally in the manufacture of tires. The remainder of the production is used as filler or pigment in the manufacture of printing inks, paints, paper and plastics.

All carbon blacks regardless of their method of manufacture or raw materials from which they are made possess many similar properties. They all consist of from 90–99% elemental carbon, the remainder consisting of various amounts of oxygen, hydrogen and volatile hydrocarbons depending upon the type of black and its method of manufacture. Thus, the distinctions between the various types and grades of carbon black are ones of degree. These distinctions are based on such properties as average particle size, particle size distribution, surface area, chemical composition of the surface, and the extent of particle-to-particle association referred to as "chain structure" or simply "structure." Structure is known to have marked effect upon the properties which carbon black imparts to rubber, such as its ease of extrusion, electrical conductivity and elastic modulus. Compressibility and oil absorption are sensitive functions of structure and are used for evaluating this characteristic. The structure of oil furnace blacks can be altered by the addition of additives such as alkali metals to the hydrocarbon feed stock prior to its thermal decomposition.

All methods of making carbon black consist of converting hydrocarbons to elemental carbon. Lamp black is made by partially burning petroleum or coal tar residues in shallow pans, channel black by impinging a natural gas flame on steel channels, and furnace black by combusting one part and thermally decomposing the other part of gaseous or liquid hydrocarbon feed stock in specially designed furnaces. Thermal black is likewise produced in a furnace; however, reactor heat for decomposition of the hydrocarbon feed is supplied indirectly, and essentially no oxygen is present in the pyrolysis reaction.

In order to have the best properties for most of its uses, and particularly for use in tires, carbon black must be of very fine particle size. Channel black is usually considered the highest quality black, having average particle diameters of about 90–290 A. and surface areas of about 100–1000 m.²/g. Unfortunately, however, the channel process is a very inefficient one and results in yields of only about 7%. By way of comparison the furnace process results in about a 35% yield or better. Most carbon black today is therefore made by one of the numerous varieties of the furnace process. Furnace blacks, however, are much coarser than channel blacks, having average particle diameters of about 180–550 A. and surface areas of about 25–200 m.²/g. Those furnace blacks which approach the quality of channel blacks are usually obtained only at a considerable sacrifice in yield.

The furnace process consists basically of thermally decomposing either liquid or gaseous hydrocarbons by bringing them into contact with hot gases, as for example, combustion gases resulting from the precombustion of fuel and the partial combustion of feed stock in a furnace or other suitable reaction chamber; flowing the mixture of carbon black particles and gases formed by the decomposition and combustion from the furnace, quenching the mixture, and then separating the carbon black from the gaseous products. The separation is usually accomplished by means of electrical precipitation followed by bag filtration. Although, as noted above, furnace black is generally inferior to channel black, the yield is substantially greater.

Although most furnace processes employ air to provide the oxygen necessary for combustion of the hydrocarbon fuel, the use of oxygen gas in place of air has also been proposed, for example, by Williams in U.S. Pat. No. 2,623,811. Williams, however, has found it necessary to dilute the oxygen with four or more volumes per volume of oxygen of what he calls "heat-absorbing" gases, specifically $CO_2$, $CO$, $H_2$ or water vapor, in order to lower the temperature of the combustion reaction. Since Williams' oxidizing gas ends up containing 20 percent or less oxygen, what he has done, in effect, is to replace the nitrogen which would be in the air with one of the aforementioned "heat-absorbing" gases.

Although precise knowledge of the mechanism of decomposition is lacking, it is generally accepted that initial decomposition occurs by cracking and dehydrogenation to form active fragments which then combine to form nuclei. These may then either be destroyed by oxidation or continue to grow and emerge as a solid carbon particle. The greater the number of nuclei created the smaller the size of the carbon black produced. Accordingly, high temperatures and rapid heat transfer for the speedy production of nuclei, short growth time, and uniform conditions during growth are necessary for efficient production of fine particle size carbon black having a narrow particle size distribution.

OBJECTS

It is accordingly an object of this invention to provide a process for the manufacture of carbon black which proceeds at high temperatures, permits rapid heat transfer from the combusted gases to the hydrocarbon feed stock to be thermally decomposed, and provides short residence time in the reaction zone of the burner.

It is another object of this invention to provide an improved process for the manufacture of carbon black; more particularly, to improve upon the furnace process, by making it more efficient and causing it to produce a product of fine and substantially uniform particle size, i.e. having a narrow particle size distribution.

It is a further object of this invention to produce carbon blacks having controlled and narrow particle size distributions, average particle diameters of about 50 to 550 A., and surface areas of about 20 to 1000 m.$^2$/g.

SUMMARY OF THE INVENTION

These and other objects which will become apparent from the accompanying description and drawing, are achieved by a process comprising: (1) combusting a fuel with an oxygen containing gas containing at least 50 percent oxygen by volume in order that the combusted gases attain a temperature of about 4000–6000° F., (2) causing the stream of the combusted gases to attain an average velocity of at least 1000 ft./sec., and (3) introducing a hydrocarbon feed material into the hot combusted gases, thereby causing said feed material to be rapidly sheared, dispersed, and thermally decomposed by said hot combusted gases to carbon black. Thereafter the reaction products pass through a refractory lined or water cooled furnace where further pyrolysis may take place, cooled to about 400–600° F. by conventional means, such as by quenching with water, and the carbon black separated from the off-gases. Ordinarily this separation is accomplished by electrostatic separators, bag filters or both. It is to be understood that the above-enumerated steps (2) and (3) are not necessarily sequential, i.e., step (3) does not have to be carried out following step (2), but may precede it. In other words, the hydrocarbon feed material may be introduced either directly or indirectly into the high velocity combusted gases.

DETAILED DESCRIPTION OF THE INVENTION

One way of carrying out the process of this invention is to inject the hydrocarbon feed material directly into the high velocity stream of combusted gases. This method is described in greater detail below in the discussion relating to the embodiment of this invention shown in the drawing. It is, however, within the scope of this invention to introduce the hydrocarbon feed material indirectly into the hot, high velocity gases; e.g., by introducing the feed material through the hot combusted gases which have not yet reached the high velocity essential for shearing and dispersing the feed material. Thus, sequentially, the hydrocarbon feed is first introduced into the combusted gases which are thereafter caused to attain the critical high velocity. One way of carrying out this type of feed introduction is to inject and shoot a solid stream of feed material, for example an oil stream, axially down the center of the burner, in such manner as to keep the oil in a solid stream until it reaches the reaction zone where the hot high velocity combusted gases disperse, shear, and thermally decompose the hydrocarbon feed to carbon black.

Although pure oxygen is preferred as the oxidant for combusting the fuel, oxygen enriched air containing at least 50 percent oxygen by volume may also be used. The amount of oxygen used to combust the fuel should be approximately the stoichiometric amount required to completely combust all of the fuel to $CO_2$ and water, since complete combustion of the fuel results in a higher flame temperature than incomplete combustion to CO. By completely combusting the fuel, temperatures of about 4000–6000° F. can be obtained in the combustion zone of the burner. This high temperature is critical to the achievement of the desired results, since it is responsible for the rapid and uniform thermal decomposition of the hydrocarbon feed material to carbon black. Due to the endothermic nature of the reaction, the final temperature in the reaction zone is about 2500–4000° F.; preferably it is maintained at about 3000–4000° F.

If pure oxygen, i.e. of at least 95% purity, is used in the above process, it results in several important advantages. First, it provides higher flame and reaction temperatures, thus increasing the reaction rates. Second, it provides more efficient use of the heat of combustion, since a greater fraction of the heat is available above the minimum temperature for cracking the hydrocarbon material. Third, it permits the use of relatively small sized equipment as compared to that which is necessary when air is used as the source of oxygen for combustion. And fourth, it permits the off-gases from the reaction, which are primarily hydrogen and carbon monoxide, to be used as synthesis gases, for example, in the synthesis of methanol without requiring the costly step of removing nitrogen from such gases. Optionally, a portion of the off-gases may be recycled and used as fuel for the combustion reaction. It has been found that by recycling some of the off-gases containing carbon monoxide, a further improvement in the overall yield of the process is obtained. The off-gases may also, of course, be burned and the heat thus generated used to preheat the fuel, oxidant gas or hydrocarbon feed material.

It is also critical that the combusted gases reach an average velocity in the reaction zone of at least 1000 ft./sec. It may be as high as 6000 ft./sec. Preferably, the average velocity in the reaction zone is between 2000 and 6000 ft./sec. the high velocity of the combusted gases causes the hydrocarbon feed material to be rapidly sheared and dispersed, and immediately thereafter pyrolized by the high temperature to carbon black.

The required high velocity of the combusted gases may be obtained by a variety of techniques and burner designs. For example, it may be achieved by reducing the cross-sectional area of the burner between the combustion zone and reaction zone. Necking of the burner is, however, only one of several methods by which the increased velocity of the combusted gases can be obtained. A diverging conical interior burner-wall design may also be used, provided the high temperature of the combusted gases increases the volume of the off-gases sufficiently to cause the high velocity required. A cylindrical burner operated under sufficient pressure and pressure drop to give the high velocities required may also be used.

The manner in which the hydrocarbon feed material is introduced into the high velocity stream of combusted gases is a matter of choice. Several such methods have already been mentioned. One such method can be seen in the accompanying drawing which shows oil stock being injected into the combusted gases, in a direction perpendicular to the axis of the stream of combusted gases, through an opening in the upstream end of the reaction zone B of the burner. Several such openings located circumferentially around the burner may be used if desired. The oil stock may also be introduced (not shown in drawing) in a direction tangential to the circumference of the cylindrical inner wall 35 of the burner. Numerous other modifications will also be apparent to those skilled in the art.

The critical characteristics of the introduction of the hydrocarbon feed material is that it be such that the feed is subjected to the shearing effect of the hot high velocity combusted gases, very rapidly and substantially completely dispersed, and almost immediately decomposed to carbon black. Since it is the high velocity of the gases which is depended upon to disperse the feed, it need not be introduced by means of an atomizer or spray nozzle, but may be introduced simply through an unrestricted capillary opening and under merely sufficient pressure to maintain the desired rate of flow.

Any conventional liquid or gaseous hydrocarbon may be used as the fuel in the process of this invention. Suitable hydrocarbon fuels include petroleum hydrocarbons. These may be paraffinic, olefinic, aromatic or naphthenic in character. Natural gas or methane is the preferred fuel. Non-hydrocarbons such as hydrogen and carbon monoxide may also be used as fuels either alone or together with the hydrocarbons.

Suitable hydocarbon feed materials are those which can be thermally decomposed to carbon black at the conditions specified herein. Such materials are well-known to those skilled in the art. Suitable hydrocarbons for feed include the petroleum hydrocarbons, such as paraffinic, naphthenic, olefinic or aromatic refinery products. Illustrative materials include gasoline, butane, propane and benzene. Petroleum gas oils or distillates, as well as by-product residues from petroleum cracking may also be used. Coal tar products such as naphthalene and anthracene oils are also suitable. Preferred hydrocarbon stocks are highly aromatic.

While not wishing to be limited to any theory of operation, it is believed that as a result of the high decomposition temperature and well dispersed feed material provided by the process of this invention, the hydrocarbon feed material goes through an acetylene phase prior to its ultimate reduction to carbon black.

An important advantage of the process of this invention is the high yield of carbon black obtained. Yields as high as 46% based on the carbon content of the feed material have been obtained in the production of channel black quality carbon black. Another advantage of the process is that it achieves maximum efficiency by having the process so designed as to separate almost completely the combustion reaction from the carbon forming reaction. Accordingly, the fuel gases are burned to completion, liberating the maximum amount of heat per unit weight fuel and at the maximum temperature, prior to the introduction of the hydrocarbon feed material to be pyrolized. Furthermore, by dispersing the feed material, the efficiency of heat transfer from the hot combustion gases to the dispersed feed is greatly promoted by having the maximum surface area of contact therebetween.

A still further advantage of the process of this invention is that it makes maximum use of high temperature energy to thermally decompose or pyrolize the hydrocarbon feed material to carbon black without the usual attendant problems of furnace refractory wear—as illustrated, for example, by the above mentioned Williams patent. The effluent gas mixture emerging from the burner is at a temperature of from about 3000 to 4000° F. since a considerable portion of the high temperature energy is consumed in vaporizing and pyrolizing the feed material.

In order to obtain the maximum temperature in the combustion reaction, preheating both the fuel and oxygen feed streams can be useful. Likewise, the oil stock may be preheated prior to being injected into the high velocity stream of combusted gases. An efficient way of preheating these streams is with the off-gases produced by the process.

The carbon black produced by the process of this invention is characterized by having the following properties: an average particle diameter of about 50 to 550 A., preferably 100 to 500 A., a surface area of about 20 to 1000 m.$^2$/g., an oil absorption of about 0.8 to 3.0 cm.$^3$/g., and nigrometer values of 60 to 100, preferably 60 to 85. The uniqueness of the carbon black produced by the process of this invention is that it possesses a combination of highly desirable properties such as not heretofore obtainable by any direct carbon black producing process, i.e. one requiring no after treatment.

In addition, a distinguishing characteristic of the carbon black made in accordance with this process is the uniformity, i.e. the narrow size distribution of the particles obtained.

THE DRAWING

In order to more clearly describe the present invention the accompanying drawing is referred to. The drawing illustrates, somewhat fragmentarily, in longitudinal cross-sectional view a burner suitable for carrying out the process of this invention.

The burner in the figure shown is comprised of a mixer head 1 and a cylindrical body 2. The body portion 2 of the burner is composed of two zones, a combustion zone A, and a reaction zone B. The combustion zone or chamber A is cylindrical in shape. It tapers down and communicates with reaction zone B which has a slightly expanding conical shape, with the wider portion of the cone being at the discharge end of the burner. Burner body 2 is comprised of an outer copper tube 3 and an inner concentrically located bored copper conduit 4. The annular space defined by the inner surface 5 of the outer tube 3 and the outer surface 6 of inner conduit 4 constitutes a cooling chamber 28 through which water is circulated to prevent the burner from overheating. Oil feed is injected into the upstream end of reaction zone B of burner body 2 through an inlet port 7 which communicates through a passageway 8 with reaction zone B. Passageway 8 is located perpendicular to the axis of conduit 4. Thus, the oil is injected in a direction perpendicular to the direction of the high velocity stream of combusted gases.

Mixing head 1 is composed of a housing 9 and a mixer 10. Housing 9 is threadably attached to ring member 11, which in turn is welded circumferentially at 12 to burner body 2. To obtain a fluid tight seal between ring member 11 and housing 9, an O-ring gasket 13 is placed in an annular groove circumferentially surrounding mixer 10 as shown. Housing 9 is provided with an inlet port 14 through which the oxidant gas is introduced into mixer 10. Inlet 14 communicates by means of passageway 15 and annular groove 16 with mixer 10. The oxidant gas flows from groove 16 through a plurality of passages 17, then through the annular communicating groove 18 and emerges from the mixer through a plurality of discharge orifice passages 19. Housing 9 also contains a fuel inlet 20 which communicates through passage 21 with mixer 10. The fuel passes through passage 21 into passage 22 of mixer 10 and emerges from the mixer through a plurality of small bore openings 23. The bores 19 and 23 are located at 45° angles from the central axis of mixer 10 so that the emerging streams of fuel and oxidant intersect in combustion chamber A a short distance downstream of the tip of mixer 10. In order to have a fluid-tight seal between the mixer housing 9 and mixer 10, O-ring gaskets 24 and 25 are inserted in annular grooves provided therefor in mixer 10 and housing 9 respectively.

Mixer housing 9 is also provided with a water inlet port 26 which communicates through annular passageway 27 with cooling chamber 28. The cooling water is discharged at the downstream end of the burner through conduit 29. The discharge end of the burner is provided with an annular cap 30 which is circumferentially welded to outer tube 3 at 31 and 32. The cooling water is discharged from chamber 28 through a plurality of passages 33 through tube 3 into annular chamber 34 and thence out through conduit 29.

The following examples which are given by way of illustration only, demonstrate the method by which the process of the present invention is carried out using the burner apparatus such as described above and in the accompanying drawing.

EXAMPLE I

The burner shown in the accompanying drawing has an outside diameter of 2 inches and an overall length of 17 inches. The combustion chamber is about 5 inches long and has an inside diameter of 1¼ inches. The reaction chamber is about 8½ inches long and has an inside diameter (I.D.) of 7/16 inch at its upstream end and a one inch I.D. at the discharge end of the burner.

Natural gas at the rate of 9 standard cubic feet/minute (s.c.f.m.) was introduced into the burner along with pure oxygen at the rate of 18 s.c.f.m. The temperature of the combustion gases before introduction of the oil was about 4800° F. Oil stock was introduced into the burner at the rate of 0.083 gallon/minute. The off-gases and carbon black emerging from the discharge end of the burner were passed into a conventional refractory lined furnace at the end of which the mixture was cooled by a water quench to about 600° F. The carbon black was thereafter collected by means of bag filters. The yield of carbon black was 3.0 pounds/gallon of oil feed used, giving a yield of about 40 percent based on the carbon content of the oil. The carbon black collected was of channel grade and had the following properties: average particle diameter of about 200 A., a calculated surface area of approximately 300 m.$^2$/g. and a nigrometer value of 79.

The yield above is considerably more favorable than those obtained by prior art methods, as can be seen by comparison to figures reported in the U.S. Bureau of Mines Minerals Yearbook (1963) which shows that the average yield of domestically produced channel black in 1963 was only 2.2 lbs. per 1000 ft.$^3$ of natural gas which is only about a 7% yield of carbon black based on the carbon content of the raw material used.

EXAMPLE II

The burner used was such as that shown in FIG. 5 of commonly assigned copending application Ser. No. 629,601, filed Apr. 10, 1967 by K. Kiyonaga, except that, instead of the feedstock being injected through a central axial port, an elongated axial probe was used which extended through most of the combustion chamber and released the liquid feedstock in the converging section leading into the discharge throat of the burner. The burner was connected axially with a reaction furnace composed in series of: a 1" diameter section 6" long, a 2" diameter section 3" long and a 3" diameter section 42" long, immediately following which was the water quench section used to terminate the reaction. In this run 1100 standard cubic feet per hour of oxygen was fed through the mixer ports along with 3.9 gallons per hour of "Aromatic HB" a conventional carbon black raw material having a petroleum fraction with a hydrogen to carbon ratio of about 1:15. This mixture of oxygen and oil represents stoichiometric proportions for 100% theoretically complete combustion to $CO_2$ and $H_2O$. The calculated equilibrium flame temperature is about 4900° F.

With the combustion fire thus established, 6.3 gallons per hour of the same "Aromatic HB" oil was introduced through the water-cooled axial probe as the basic feedstock. The estimated velocity of the resulting mixture of hot combustion gases and entrained liquid feedstock as it passes through the throat is approximately 3400 feet per second. For the overall process, the proportion of oxygen to oil represented about 38% of that required for theoretically complete combustion to $CO_2$ and $H_2O$.

The carbon black product was collected by means of a cyclone collector plus a bag filter connected in series. Sample analyses revealed the following:

Nigrometer scale—72
Surface area ($N_2$ adsorption)—326 m.$^2$/gm.
DBP (dibutyl phthalate absorption)—169 gm./gm.
"Tint" (relative tinting strength)—255%
pH (in aqueous dispersion)—7.3
Extract (matter extractable by benzene)—0.1%

The test methods used in the above analyses are conventional and described in the article on "Carbon Black" by W. R. Smith in the "Encyclopedia of Chemical Technology," edited by Kirk and Othmer.

The above analyses indicate that the product falls within the classification of Medium Color Channel Black—at least on the basis of nigrometer scale and surface area. There are, however, at least two striking differences between the product obtained above and a conventionally produced Medium Color Channel Black. For a black of 72 nigrometer scale, a tinting strength of 255% of SRF is unusually high, inasmuch as a conventionally produced black of similar scale has tinting strengths ranging from only about 160 to 185%. In addition, the pH of conventionally produced channel black is in the range of 3 to 5, while in the above example the pH is 7.3, which is substantially neutral and nearly the value obtained in typical furnace blacks. The above product having the combined properties of low nigrometer scale and very high tinting strength is surprising, particularly since it was obtained in excellent yields *directly* by a furnace process, i.e. without any after treatment. The yield for the above Example II was 2.11 pounds per gallon, equivalent to 28% of the total available carbon when based on all of the "Aromatic HB" oil used (i.e. for both fuel and feedstock) or 3.4 pounds per gallon, equivalent to 46% of available carbon when based only on basic feedstock and ignoring the oil which was mixed with the oxygen and which could be considered as merely replacing the gaseous fuel normally burned to supply heat for the carbon black producing reaction. Carbon black having comparable nigrometer scale can be produced only by the conventional channel process with natural gas at yields of approximately 1 pound per 1000 s.c.f. of natural gas. This corresponds to a yield of only about 3% of the total available carbon in the gas.

What is claimed is:

1. A process for producing carbon black comprising:
   (1) feeding fuel and an oxygen-containing gas containing at least 50% oxygen by volume into a water-cooled, heat-conducting metal combustion zone,
   (2) combusting said fuel and oxygen in said combustion zone, thereby causing the combusted gases to attain a temperature of from about 4000–6000° F.,
   (3) discharging the hot combusted gases from said combustion zone into a constricted, water-cooled, heat-conducting metal reaction zone, thereby causing said hot combusted gases to attain an average velocity of at least 1000 ft./sec.,
   (4) introducing hydrocarbon feed material into said hot, constricted, high-velocity combusted gases in the upstream end of said reaction zone, thereby causing said feed material to be rapidly sheared, dispersed and thermally decomposed to carbon black, and
   (5) maintaining the exit temperature in said reaction zone at a temperature of about 2500–4000° F.

2. The process of claim 1 wherein the oxygen containing gas is substantially pure oxygen.

3. The process of claim 1 wherein the gas used to combust the fuel is a mixture of air and oxygen, enriched to contain at least 50 percent oxygen by volume.

4. The process of claim 1 wherein the fuel is selected from the group consisting of gaseous hydrocarbon fuel, carbon monoxide, hydrogen, and mixtures thereof.

5. The process of claim 1 wherein the fuel is a liquid hydrocarbon fuel.

6. The process of claim 1 wherein the average velocity of the combusted gases is between 2000 and 6000 ft./sec.

7. The process of claim 1 wherein the hydrocarbon feed material is liquid.

8. The process of claim 1 wherein the hydrocarbon feed material is gaseous.

9. The process as claimed in claim 1 which contains the additional steps of:
   (4) passing the mixture of carbon black and hot gases into a furnace zone where the thermal decomposition reactions are allowed to proceed further,
   (5) quenching the mixture of carbon black and off-gases upon emergence from said furnace zone with water to cool it to 400° to 600° F.,
   (6) separating the carbon black from the off-gases and,
   (7) collecting the carbon black product.

10. The process of claim 1, wherein the fuel is a liquid hydrocarbon fuel, and wherein the hydrocarbon feed material is liquid.

11. The process of claim 1 wherein the hydrocarbon feed material is introduced into the hot, high velocity combusted gases through an unrestricted capillary opening under sufficient pressure to maintain the desired rate of flow.

12. The process of claim 1 wherein the carbon black produced by said process is characterized by having a surface area of 20–1000 m.²/g., an average particle diameter of 50 to 550 A., and a nigrometer value between 60 and 85.

13. The process of claim 1 wherein the exit temperature in said reaction zone is maintained at a temperature of about 3000–4000° F.

References Cited

UNITED STATES PATENTS

| | | | |
|---|---|---|---|
| 2,623,811 | 12/1952 | Williams | 23—209.6 |
| 2,641,534 | 6/1953 | Krejci | 23—209.4 |
| 2,851,337 | 9/1958 | Heller | 23—209.4 |
| 3,009,784 | 11/1961 | Krejci | 23—209.4 |
| 3,057,688 | 10/1962 | Williams | 23—209.4 |
| 3,102,790 | 9/1963 | Perry | 23—259.5 |
| 3,256,066 | 6/1966 | Higgins | 23—209.4 |
| 3,264,065 | 8/1966 | Schirmer et al. | 23—209.6 |
| 3,375,075 | 3/1968 | Ruble | 23—209.4 |

OTHER REFERENCES

Smith "Kirk Othmer Encyclopedia of Chemical Technology," 2nd ed., 1964, vol. 4, pages 254, 255, 260–262, and 265.

EDWARD J. MEROS, Primary Examiner

U.S. Cl. X.R.

23—259.5

UNITED STATES PATENT OFFICE
CERTIFICATE OF CORRECTION

Patent No. 3,595,618   Dated July 27, 1971

Inventor(s) K. Kiyonaga et al.

It is certified that error appears in the above-identified patent and that said Letters Patent are hereby corrected as shown below:

In Col. 8, line 58, "(4)" should read -- (6) --.

Col. 8, line 61, "(5)" should read -- (7) --.

Col. 8, line 64, "(6)" should read -- (8) --.

Col. 8, line 65, "(7)" should read -- (9) --.

Signed and sealed this 22nd day of August 1972.

(SEAL)
Attest:

EDWARD M.FLETCHER,JR.
Attesting Officer

ROBERT GOTTSCHALK
Commissioner of Patents